United States Patent
Mitsumori et al.

(10) Patent No.: US 6,850,525 B2
(45) Date of Patent: Feb. 1, 2005

(54) VOICE OVER INTERNET PROTOCOL (VOIP) NETWORK PERFORMANCE MONITOR

(75) Inventors: Derek Hisami Mitsumori, Waltham, MA (US); Sujin Catherine Chang, Stow, MA (US); Kwang-Shan Pan, Acton, MA (US)

(73) Assignee: Level 3 Communications, Inc., Broomfield, CO (US)

( * ) Notice: Subject to any disclaimer, the term of this patent is extended or adjusted under 35 U.S.C. 154(b) by 55 days.

(21) Appl. No.: 10/038,837

(22) Filed: Jan. 4, 2002

(65) Prior Publication Data

US 2003/0128692 A1 Jul. 10, 2003

(51) Int. Cl.$^7$ .......................... H04L 12/28; H04L 12/56
(52) U.S. Cl. .................. 370/395.52; 370/352; 370/401
(58) Field of Search .......................... 370/229, 230.1, 370/231–236, 237, 238, 241, 249, 252, 351, 389, 395.52, 401

(56) References Cited

U.S. PATENT DOCUMENTS

| | | | |
|---|---|---|---|
| 2002/0015387 A1 | * | 2/2002 | Houh .......................... 370/250 |
| 2002/0051464 A1 | * | 5/2002 | Sin et al. ..................... 370/466 |
| 2002/0141389 A1 | | 10/2002 | Fangman et al. |
| 2002/0141392 A1 | * | 10/2002 | Tezuka et al. ............... 370/352 |

\* cited by examiner

*Primary Examiner*—Wellington Chin
*Assistant Examiner*—Raj Jain
(74) *Attorney, Agent, or Firm*—Faegre & Benson LLP

(57) ABSTRACT

Packet delivery statistics are derived from a User Datagram Protocol (UDP) stream simulating a service level provided by a Voice over Internet Protocol (VoIP) network and transmitted across the VoIP network at a first pre-defined interval. The derived packet delivery statistics are processed at a second pre-defined interval to generate network performance statistics for the VoIP network, where the second pre-defined interval is substantially larger than the first pre-defined interval.

44 Claims, 3 Drawing Sheets

VOICE OVER INTERNET PROTOCOL (VOIP) NETWORK PERFORMANCE MONITOR

BACKGROUND

The invention relates to a Voice over IP (VoIP) network performance monitor.

Packet-based networks, in particular, VoIP networks, are rapidly emerging as a viable alternative to traditional telephony (that is, circuit switched networks). VoIP is viewed as an attractive option for voice transport in that it allows live voice conversations to be integrated with existing IP data and image applications. To be a truly competitive alternative, VoIP must emulate the performance of traditional telephony and do so using a protocol that was optimized for data traffic. The characteristics of data traffic are quite different from those of voice traffic.

Unlike data traffic, voice traffic is extremely intolerant of delay and delay variation (or "jitter"), as well as, packet loss. Much work has been done in the area of packet delivery to provide end-to-end Quality of Service (QoS). Service level agreements (SLAs) for VoIP, like those for conventional data IP networks, tend to be based on conventional data network metrics—that is, guaranteed service levels are expressed solely in terms of packet level performance, for example, packet loss, jitter, and round-trip delay.

Traditional network performance measurement tools use Packet InterNet Gropers (PINGs) to measure packet loss, jitter and round-trip delay. However, VoIP networks are packet-based networks that transmit data in one-way steady streams of User Datagram Protocol (UDP) packets, which PINGing tools cannot simulate. In addition, traditional network monitoring systems accept performance data that has been averaged over an extended period of time, such as a day or a month. While such measurements are acceptable for data transmissions, which are typically TCP in nature, the real-time nature of VoIP service makes daily and/or monthly averaging of performance results inaccurate in representing a VoIP network user's experience of the service.

SUMMARY

In general, according to one aspect of the invention, a method includes deriving packet delivery statistics from a User Datagram Protocol (UDP) stream simulating a service level provided by a Voice over Internet Protocol (VoIP) network and transmitted across the VoIP network at a first pre-defined interval, and processing the derived packet delivery statistics at a second pre-defined interval to generate network performance statistics for the VoIP network, where the second pre-defined interval is substantially larger than the first pre-defined interval.

One or more of the following features may also be included.

A first client terminal connected to the VoIP network generates the UDP stream. In certain embodiments, generating a UDP stream includes selecting a service level and adjusting payload sizes and bit rates of the UDP packets according to the selected service level.

As yet another feature, the method also includes setting an IP precedence bit to specify a class of service for each UDP packet. The UDP stream is transmitted by a first client terminal connected to the VoIP network to a second client terminal connected to the VoIP network.

As another feature, the packet delivery statistics are derived from the UDP stream by a first client terminal connected to the VoIP network. Deriving packet delivery statistics includes measuring packet loss of the UDP stream at each first pre-defined interval. In certain embodiments, deriving packet delivery statistics further includes measuring jitter of the UDP stream at each first pre-defined interval.

As yet another feature, deriving packet delivery statistics includes measuring round-trip delay of the UDP stream at each first pre-defined interval. The network performance statistics are generated by a monitoring device connected the VoIP network.

The method also includes generating a graphical report showing a distribution of the derived packet delivery statistics over the second pre-defined interval. In certain embodiments, a first client terminal is connected to a first VoIP Point of Presence (VoIP PoP) on the VoIP network and a second client terminal is connected to a second VoIP PoP on the VoIP network and the method also includes triggering a traceroute that traces a route between the first VoIP PoP and the second VoIP PoP if any one of the network performance statistics exceeds a pre-configured threshold.

According to another aspect of the invention, a Voice over Internet Protocol (VoIP) network performance testing system includes a VoIP network, a first client terminal connected to the VoIP network, the first client terminal configured to generate a stream of User Datagram Protocol (UDP) packets simulating a service level provided by a Voice over Internet Protocol (VoIP) network, transmit the UDP stream across the VoIP network to a second client terminal connected to the VoIP network, derive packet delivery statistics from the UDP stream at a first pre-defined interval, and a monitoring device connected to the VoIP network, the monitoring device configured to process the derived packet delivery statistics at a second pre-defined interval, and generate network performance statistics for the VoIP network, where the second pre-defined interval is substantially larger than the first pre-defined interval.

One or more of the following features may also be included.

In certain embodiments, the UDP stream is generated by a first client terminal connected to the VoIP network.

As another feature, generating includes controlling the first client terminal to select a service level and generate a UDP stream having payload sizes and bit rates corresponding to the selected service level.

As yet another feature, system also includes controlling the first client terminal to set an IP precedence bit to specify a class of service for each UDP packet.

As another feature, the system includes controlling the monitoring device to trigger an alarm if any one of the network performance statistics exceeds a pre-configured threshold.

In certain embodiments, the first client terminal is connected to a first VoIP Point of Presence (VoIP PoP) on the VoIP network and the second client terminal is connected to a second VoIP PoP on the VoIP network, the system also including controlling the monitoring device to trigger a traceroute that traces a route between the first VoIP PoP and the second VoIP PoP if any one of the network performance statistics exceeds a pre-configured threshold.

The system may also include controlling the first client terminal to store results of the traceroute in a traceroute file, wherein the results comprise Internet Protocol (IP) addresses of each router in the route, and send the traceroute file to the monitoring device.

Embodiments may have one or more of the following advantages. The invention enables a VoIP-simulated UDP stream to be generated between every possible pair of VoIP Points of Presence (VoIP PoPs) for use in testing the performance of a VoIP network. The invention generates and reports performance results in a manner that reflects the real-time nature of the VoIP services offered by the VoIP network. With these performance results, a network operator can assess the quality of the VoIP network's services on a daily basis for use with Service Level Agreements, as well as, identify possible problem areas in the VoIP network that may affect performance.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
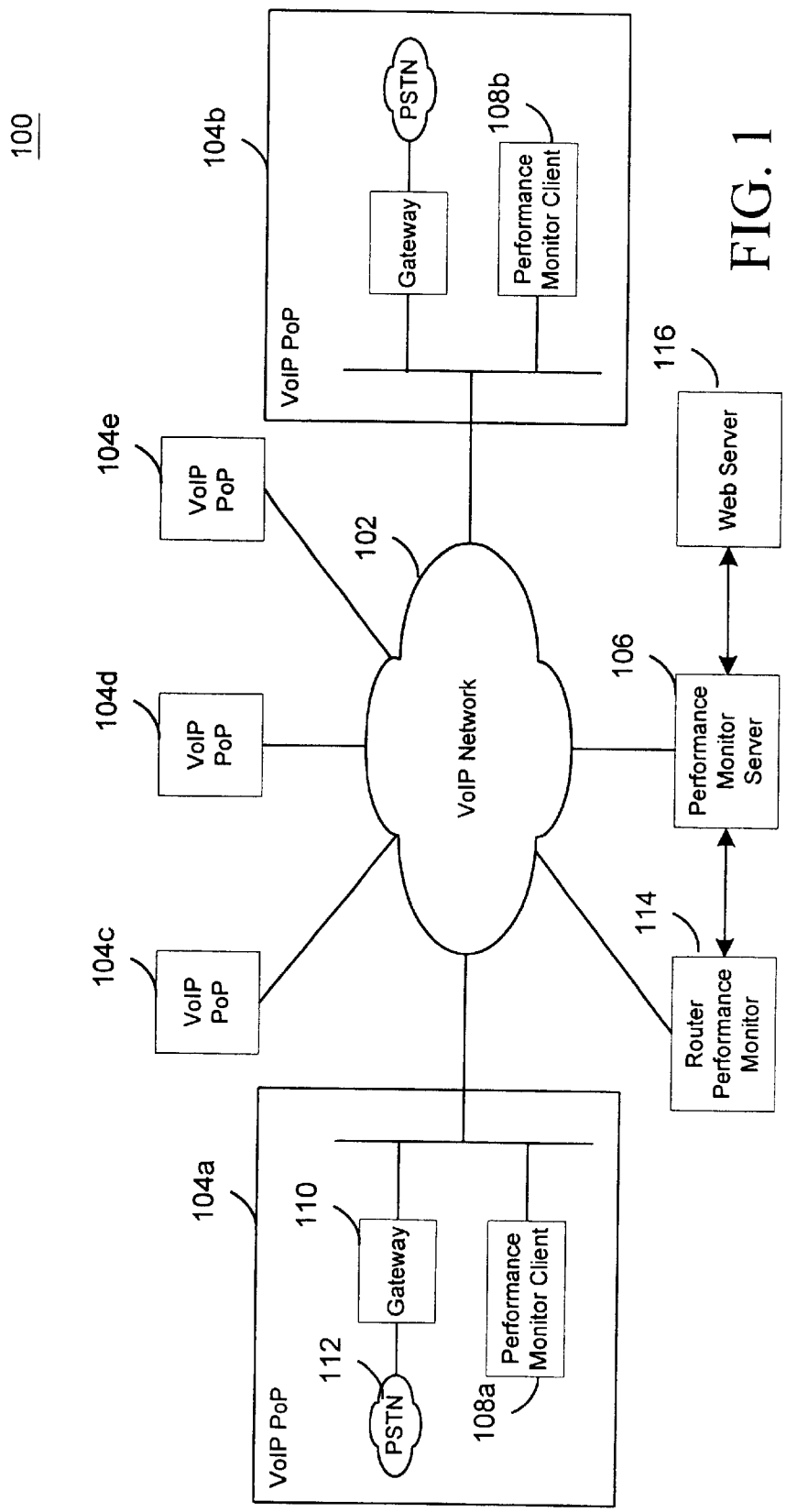
FIG. 1 is a block diagram illustrating a Voice over Internet Protocol (VoIP) network performance test topology.

In one exemplary commercial setting, as shown in FIG. 1, a network infrastructure 100 of a VoIP network 102 is maintained by a VoIP network operator (not shown), such as Genuity Inc. of Woburn, Mass., and made available to that VoIP network operator's customers (not shown), for example, retail service providers who use the infrastructure and related services of the VoIP network operator to provide VoIP services to end users. In a large-scale operation, the network operator supports a large number of VoIP Points of Presence (VoIP PoPs) 104, in different geographic regions for coverage of a larger territory, for example, national level coverage. Each VoIP PoP 104 provides a point of entry to and termination from the VoIP network 102.

The network operator monitors the performance of the VoIP network 102 through the use of a VoIP-performance monitor server (or performance monitor server) 106 and VoIP-performance monitor clients (performance monitor clients) 108 deployed at VoIP PoPs 104 throughout the network 102. Each of the performance monitor clients 108 is configured to generate VoIP-simulated UDP streams to others of the performance monitor clients 108 over the VoIP network 102, and perform network parameter and performance measurements (collectively called "performance data"). Preferably, a VoIP-simulated UDP stream is produced by the performance monitor client 108 for each level of service as determined by the type of codec (i.e., coder/decoder) used by a VoIP communications device that is performing the voice encoding and decoding operations at the VoIP PoP 104. In the VoIP PoP 104a shown in FIG. 1, a gateway 110 is used to implement one or more coding schemes to support voice encoding/decoding between protocols of the VoIP network 102 and a conventional telephony network, such as a Public Switched Telephone Network (PSTN) 112.

Types of codecs include, but need not be limited to, the following: waveform codecs, source codecs, and hybrid codecs. With waveform codecs, an incoming voice signal is sampled, coded and the coded samples converted to quantized values, which are used to reconstruct the original voice signal. Waveform codecs (e.g., G. 711 and G. 726) produce high quality sound but consume a significant amount of bandwidth. Source codecs try to match an incoming voice signal to a mathematical model of speech generation. That model is used to reconstruct the original voice signal. The source codec operates at low bit rates but tends to produce poor quality sound. Hybrid codecs (e.g., G. 729 and G. 723) use some amount of waveform matching as well as knowledge of how the original sound was generated. They tend to provide fairly good quality sound at lower bit rates than waveform codecs. Due to its lower bandwidth requirements, G.729 is the codec of choice for VoIP network performance testing.

Figure 2:
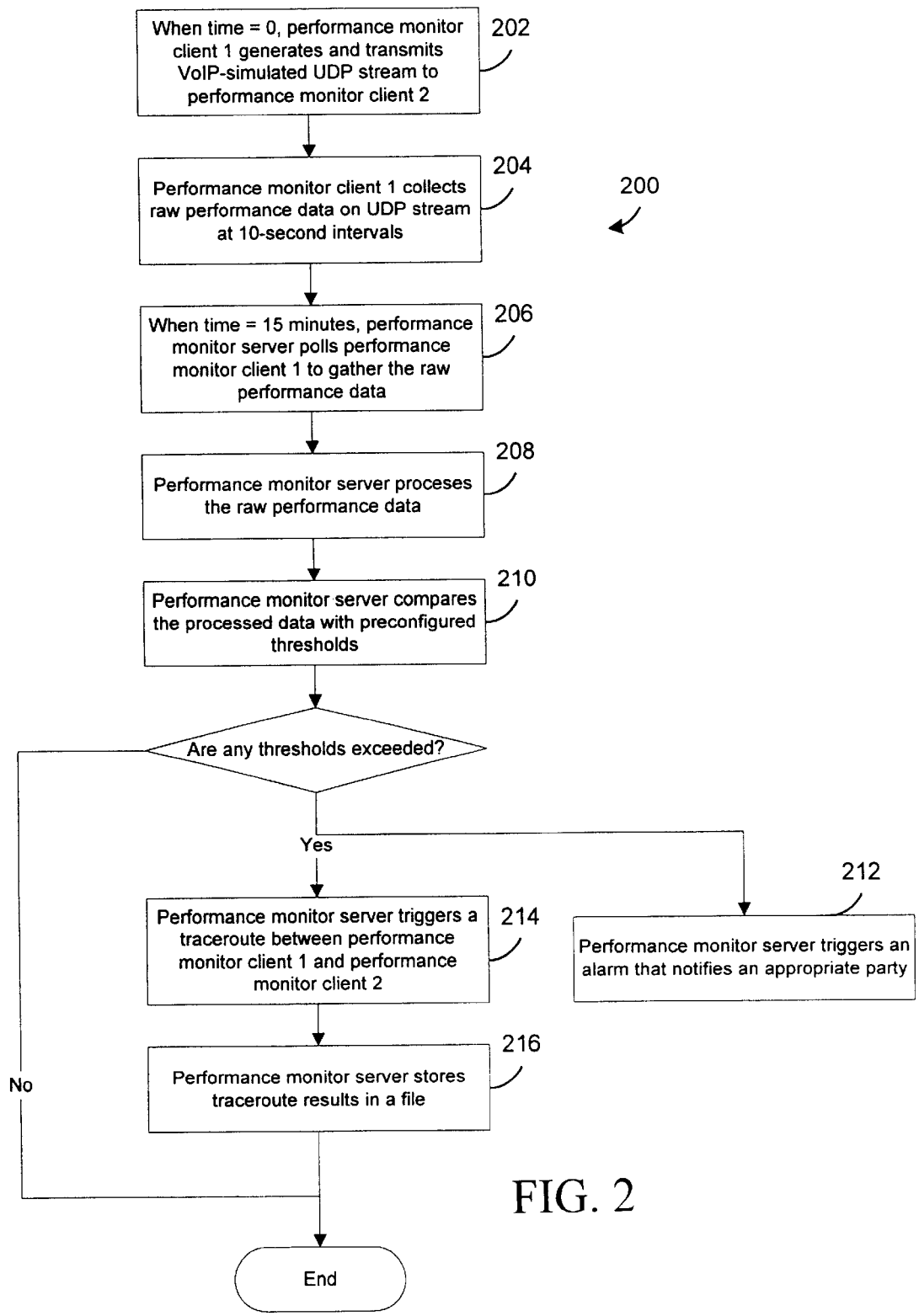
FIG. 2 is a flowchart of a process for testing the performance of a VoIP network.

FIG. 2 shows a process 200 implemented by the performance monitor server 106 and the performance monitor clients 108. The performance monitor client 108a is configured to generate and transmit (202) a VoIP-simulated UDP stream to every VoIP PoP 104 in the VoIP network 102, including the VoIP PoP 104b having a performance monitor client 108b. In one implementation, the performance monitor client 108a in VoIP PoP 104a is configured to automatically start a new 24-hour testing session, say, for example, every morning after midnight, by generating and transmitting a UDP stream to the performance monitor client 108b in VoIP PoP 104b. The performance monitor client 108a collects (204) samples of raw performance data (e.g., packet loss measurements, jitter measurements, and round-trip delay measurements) on the incoming UDP stream at pre-defined intervals, for example, 10-second intervals. Thus, each sample contains 10-seconds worth of data.

The performance monitor server 106 polls (206) the performance monitor client 108a at pre-defined intervals, for example, at 15-minute intervals to gather the samples of raw data. The length of the collection interval and the polling interval may be set at any number that provides a sufficiently large sample size. The performance monitor server 106 can be designed to process (208) each sample's raw data to calculate the average, maximum, and minimum packet loss over the 15-minute period. Similar calculations can be made based on the jitter measurements and the round-trip delay measurements. Once processed, the performance monitor server 106 generates a time stamped 15-minute summary report that includes these calculations, as well as, histograms that show the distribution of the packet loss, jitter, and round-trip delay measurements during that particular 15-minute testing window. It should be noted that the data points used for the calculations and the histograms correspond to the 10-second samples. The timestamp indicates both the time and date associated with the "start" and "end" of a 15-minute testing window.

In one implementation, the performance monitor server 106 examines (210) the average and maximum values in the 15-minute summary report and triggers (212) an alarm, such as an e-mail to an employee of the network operator, if an average value or a maximum value exceeds a configurable threshold. In another implementation, the performance monitor server 106 examines (214) the average and maximum values in the 15-minute summary report and triggers a traceroute between the appropriate VoIP PoP pair (in this case, VoIP PoPs 104a and 104b) if an average value or maximum value exceeds a configurable threshold, or if the percentage of failure events (defined as high packet loss, high jitter, or high round-trip time in the 10-second sample) during the 15-minute interval exceeds configurable thresholds, such as packet loss which is greater than one percent. These thresholds may be expressed in the format of a Service Level Agreement (SLA) for VoIP services on the VoIP network 102. For example, if the average packet loss value for a UDP stream transmitted by the performance monitor client 108a and received by the performance monitor client 108b exceeds a configurable threshold, the performance monitor server 106 sends a signal to the performance monitor client 108a to trigger a traceroute that traces a route between the VoIP PoP 104a and the VoIP PoP 104b. Since UDP provides no connections but simply delivers packets, it is possible that traffic between the VoIP PoPs 104a and 104b may be sent over more than one route. Over time it is likely that the route between the VoIP PoPs 104a and 104b will vary due to changes in internet connections, modifications of routers, and changes in service. However, over the short term these changes will usually not be present, and a traceroute is a useful tool to test connectivity between the two VoIP PoPs 104a and 104b. At the conclusion of the traceroute, the performance monitor client 108a stores (216) the results of the traceroute—that is, the IP addresses of all the routers along the route between the VoIP PoPs 104a and 104b—in a time stamped traceroute file and sends the traceroute file to the performance monitor server 106. The timestamp indicates what time the traceroute was executed.

In one implementation, the network operator monitors the performance (e.g., discard rate, error rate) of the routers in the VoIP network 102 through the use of a router performance monitor server 114. The router performance monitor server 114 may be implemented using commercially available hardware and software. At the conclusion of a traceroute triggered by the performance monitor server 106, the performance monitor server 106 may be configured to establish a link to the router performance monitor server 114 to obtain the performance statistics (e.g., discard rate, error rate) associated with each traceroute hop's router, and store the results of the query in the traceroute file.

The performance monitor server 106 repeats the polling (206) of the performance monitor client 108b at 15-minute intervals until the date associated with the "end" time of the most-recent 15-minute testing window is different from the date associated with the "start" time of the first 15-minute testing window in the 24-hour testing session. When this occurs, the performance monitor server 106 does the following:

(1) The performance monitor server 106 processes the raw data collected during the most-recent 15-minute testing window, generates a 15-minute summary report, and triggers a traceroute or alarm, if necessary.

(2) The performance monitor server 106 processes all of the raw data collected during the 24-hour testing session to calculate the average, maximum, and minimum packet loss over the 24-hour period. Similar calculations can be made based on the jitter measurements and the round-trip delay measurements. Once processed, the performance monitor server 106 generates a 24-hour summary report that includes these calculations, as well as, histograms that show the distribution of the packet loss, jitter, and round-trip delay measurements per 10 seconds during that 24-hour testing session. By taking the performance measurements at different times of the day over the 24-hour period, the effect of different system loads on the measured quantity can be seen.

In one implementation, each performance monitor client 108 connected to the VoIP network 102 is configured to generate and transmit a VoIP-simulated UDP stream tagged with an IP precedence bit. Setting the IP precedence bit allows the performance monitor server 106 to check the performance of VoIP services when, for example, Quality of Service (QoS) options are configured on the VoIP network 102. In another implementation, each performance monitor client 108 is configured to generate and transmit two VoIP-simulated UDP streams simultaneously—one tagged with an IP precedence bit and one without. The generation and transmission of side-by-side streams permits the performance monitor server 106 to fully compare the relative performance of the VoIP service across different network configurations. In another implementation, each performance monitor client 108 is configured to generate and transmit multiple VoIP-simulated UDP streams, each UDP stream simulating a different voice codec used by the VoIP service.

Figure 3:
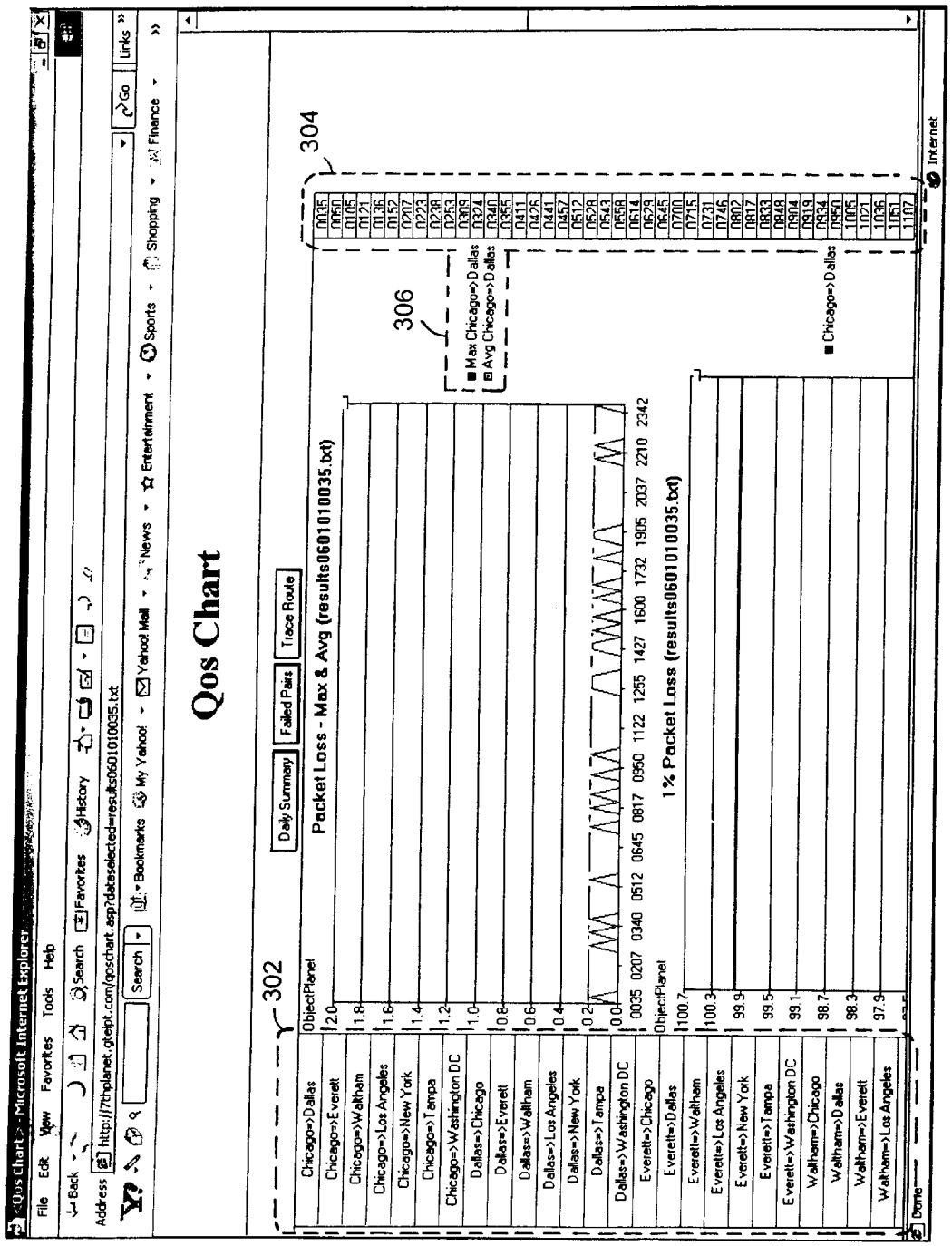
FIG. 3 shows a sample graphical user interface in accordance with the present invention.

A web server 116 connected to the performance monitor server 106 may be configured to display the average, maximum, and minimum values (called "avg/max/min") for packet loss, jitter, and round-trip delay over a 24-hour testing session on a graphical user interface (GUI), a sample of which is shown in FIG. 3. The web server 116 may be configured to generate web-based graphical reports that indicate daily packet loss avg/max/min, daily results of the 15-minute histogram reports (e.g., reporting the percent of time in each 15-minute testing window where packet loss was less than or equal to 1%), daily jitter avg/max/min, and daily round-trip delay avg/max/min. The graphs can be generated for any pair of VoIP PoPs 104 in the VoIP network 102 using the buttons on the left side of the GUI, indicated in dashed lines 302. The buttons on the right side of the GUI, indicated in dashed lines 304, correspond with the 15-minute summary reports that are the basis of the graphed results. If a user wants to examine a particular 15-minute summary report in detail after viewing the graphical results, the user may select a 15-minute Summary Report button by using, for example, a keyboard or a mouse. The web server 116 can display the selected 15-minute Summary Report in the same browser window, or alternatively, generate a new browser window. When a user selects one of the buttons, indicated in dashed lines 306, say, for example, "Max Chicago=>Dallas", the web server 116 highlights the line in the corresponding graph for the UDP stream transmitted from Chicago to Dallas during that particular 24-hour testing session.

Other embodiments are within the scope of the following claims.

What is claimed is:

1. A method for testing Voice over Internet Protocol (VoIP) network performance, comprising:

transmitting a User Datagarm Protocol (UDP) stream from a first client terminal connected to a VoIP network to a second client terminal connected to the VoIP network, wherein the UDP stream simulates a service level provided by the VoIP network;

deriving packet delivery statistics from the UDP stream;

processing the derived packet delivery statistics to generate network performance statistics for the VoIP network;

triggering a traceroute that traces a network route between the first client terminal and the second client terminal if any one of the network performance statistic exceeds a predefined threshold; and retrieving router performance statistics of each router in the route between the first client terminal and the second client terminal.

2. The method of claim 1, wherein generating a UDP stream comprises:

selecting a service level; and adjusting payload sizes and bit rates of the UDP packets according to the selected service level.

3. The method of claim 2, further comprising:

setting an IP precedence bit to specify a class of service for UDP packet.

4. The method of claim 1, wherein the packet delivery statistics are derived from the UDP stream by the first client terminal connected to the VoIP network.

5. The method of claim 1, wherein the network performance statistics are generated by a monitoring device connected to the VoIP network.

6. The method of claim 1, further comprising generating a histogram that shows distribution of measurements for packet loss.

7. The method of claim 1, further comprising generating a histogram that shows distribution of measurements for jitter.

8. The method of claim 1, further comprising generating a histogram that shows distribution of measurements for delay.

9. The method of claim 1, further comprising:

triggering an alarm if any one of the network performance statistics exceeds a pre-configured threshold.

10. The method of claim 1, wherein the first client terminal is connected to a first VoIP Point of Presence (VoIP PoP) on the VoIP network and the second client terminal is connected to a second VoIP PoP on the VoIP network.

11. The method of claim 1, further comprising:

storing results of the traceroute in a traceroute file, wherein the results comprise Internet Protocol (IP) addresses of each router in the route.

12. The method of claim 1, wherein the router performance statistics are retrieved from a router performance monitor connected to the VoIP network.

13. The method of claim 1, wherein the router performance statistics comprises discard rates for each router.

14. The method of claim 1, wherein the router performance statistics comprises error rates for each router.

15. The method of claim 1, wherein the service level is associated with a type of voice codec.

16. The method of claim 1, wherein the type of voice codec comprises a waveform codec.

17. The method of claim 1, wherein the type of voice codec comprises a source codec.

18. The method of claim 1, wherein the type of voice codec comprises a hybrid codec.

19. A Voice over Internet Protocol (VoIP) network performance testing system comprising:

a first client terminal connected to a VoIP network, the first client terminal being configured to:
generate a stream of User Datagram Protocol (UDP) packets simulating a service level provided by a Voice over Internet Protocol (VoIP) network;
transmit the UDP stream across the VoIP network to a second client terminal connected to the VoIP network;
derive packet delivery statistics from the UDP stream; and a monitoring device connected to the VoIP network, the monitoring device being configured to:
collect the derived packet delivery statistics;
process the derived packet delivery statistics; and
generate network performance statistics for the VoIP network;
wherein the first client terminal is configured to trigger a traceroute that traces a network route between the first client terminal and the second client terminal if any one of the network performance statistics exceeds a pre-defined threshold, and wherein the monitor device is configured to retrieve router performance statistics of each router in the route between the first client terminal and the second client terminal.

20. The system of claim 19, wherein the first client terminal generates the stream of UDP rackets by determining the service level and generating a UDP stream having payload sizes and bit rates corresponding to the service level.

21. The system of claim 19, wherein the first client terminal is further configured to set an IP precedence bit to specify a class of service for each UDP packet.

22. The system of claim 19, wherein the monitoring device is further configured to trigger an alarm if any one of the network performance statistics exceeds a predefined threshold.

23. The system of claim 19, wherein the first client terminal is connected to a first VoIP Point of Presence (VoIP PoP) on the VoIP network and the second client terminal is connected to a second VoIP PoP on the VoIP network.

24. The system of claim 19, wherein the first client terminal stores results of the traceroute in a traceroute file, and sends the traceroute file to the monitoring device; wherein the results of the traceroute comprise Internet Protocol (IP) addresses of each router in the route.

25. The system of claim 19, wherein the router performance statistics comprises discard rates for each router.

26. The system of claim 19, wherein the router performance statistics comprises error rates for each router.

27. A method comprising:

transmitting a first User Datagram Protocol (UDP) stream over a Voice over Internet Protocol (VoIP) network, the first UDP stream having an IP precedence bit specifying a class of service for each packet in the first UDP stream;

transmitting a second UDP stream over the VoIP network, the second UDP stream either having no IP precedence bit or having an IP precedence bit specifying a class of service for each packet in the second UDP stream different from the class of service for the first UDP stream;

deriving packet delivery statistics from the first and second UDP streams; and comparing the derived packet delivery statistics from the first and second UDP streams to determine a relative performance of transmission of UDP streams when different classes of services are used.

28. The method of claim 27 in which the packet delivery statistics are derived from the first and second UDP streams at a first pre-defined interval.

29. The method of claim 27, further comprising processing the derived packet delivery statistics at a second pre-defined interval to generate network performance statistics for the VoIP network, where the second pre-defined interval is substantially larger than the first pre-defined interval.

30. The method of claim 1, wherein the step of deriving packet delivery statistics is performed at a first pre-defined interval, and the step of processing the derived packet delivery statistics to generate network performance statistics is performed at a second pre-fined interval, and wherein the second pre-defined interval is larger than the first pre-defined interval.

31. The method of claim 30, wherein deriving packet delivery statistics comprises:

measuring packet loss of the UDP stream at each first pre-defined interval.

32. The method of claim 30, wherein deriving packet delivery statistics comprises:

measuring jitter of the UDP stream at each first pre-defined in interval.

33. The method of claim 30, wherein deriving packet delivery statistics comprises:

measuring round-trip delay of the UDP stream at each first predefined interval.

34. The method of claim 30, wherein generating network performance statistics comprises:

deriving an average packet loss value of the UDP stream over the second pre-defined interval.

35. The method of claim 30, wherein generating network performance statistics comprises:

deriving a maximum packet loss value of the UDP stream over the second pre-defined interval.

36. The method of claim 30, wherein generating network performance statistics comprises:

deriving a minimum packet loss value of the UDP stream over the second pre-defined interval.

37. The method of claim 30, wherein generating network performance statistics comprises:

deriving an average jitter value of the UDP stream over the second pre-defined interval.

38. The method of claim 30, wherein generating network performance statistics comprises:

deriving a maximum jitter value of the UDP stream over the second pre-defined interval.

39. The method of claim 30, wherein generating network performance statistics comprises:

deriving a minimum jitter value of the UDP stream over the second pre-defined interval.

40. The method of claim 30, wherein generating network performance statistics comprises:

deriving an average round-trip delay value of the UDP stream over the second pre-defined interval.

41. The method of claim 30, wherein generating network performance statistics comprises:

deriving a maximum round-trip delay value of the UDP stream over the second pre-defined interval.

42. The method of claim 30, wherein generating network performance statistics comprises:

deriving a minimum round-trip delay value of the UDP stream over the second pre-defined interval.

43. The method of claim 30, further comprising:

generating a graphical report showing a distribution of the derived packet delivery statistics over the second pre-defined interval.

44. The system as recited in claim 19, wherein the first client terminal derives packet delivery statistics at a first predefined interval, and wherein the monitor device generates network performance statistics at a second predefined interval that is larger than the firs predefined interval.

* * * * *

UNITED STATES PATENT AND TRADEMARK OFFICE
CERTIFICATE OF CORRECTION

PATENT NO. : 6,850,525 B2
DATED : February 1, 2005
INVENTOR(S) : Mitsumori et al.

It is certified that error appears in the above-identified patent and that said Letters Patent is hereby corrected as shown below:

Column 7,
Line 6, -- each -- should be inserted prior to "UDP":

Column 8,
Line 8, "rackets" should be changed to -- packets --:
Line 51, claim reference numeral "27" should be changed to -- 28 --:
Line 60, "pre-fined" should be changed to -- pre-defined --:

Column 10,
Line 27, "firs" should be changed to -- first --.

Signed and Sealed this

Fifth Day of July, 2005

JON W. DUDAS
*Director of the United States Patent and Trademark Office*